(12) United States Patent
Kwak

(10) Patent No.: US 6,384,878 B1
(45) Date of Patent: May 7, 2002

(54) LIQUID CRYSTAL DISPLAY HAVING AN ELECTROSTATIC PROTECTION CIRCUIT

(75) Inventor: Sang-Ki Kwak, Seoul (KR)

(73) Assignee: Samsung ElectronicsCo., Ltd., Suwon (KR)

( * ) Notice: Subject to any disclaimer, the term of this patent is extended or adjusted under 35 U.S.C. 154(b) by 0 days.

(21) Appl. No.: 09/415,456

(22) Filed: Oct. 14, 1999

(30) Foreign Application Priority Data

Jan. 15, 1999 (KR) .............................................. 99-1009

(51) Int. Cl.[7] .............................................. G02F 1/1333
(52) U.S. Cl. .............................. 349/40; 349/38; 349/39; 349/192
(58) Field of Search .............................. 349/38, 39, 40, 349/192

(56) References Cited

U.S. PATENT DOCUMENTS

| | | | | |
|---|---|---|---|---|
| 5,606,340 A | * | 2/1997 | Suzuki et al. .................. | 349/42 |
| 5,930,607 A | * | 7/1999 | Satou .......................... | 438/158 |
| 6,088,073 A | * | 7/2000 | Hioki et al. ................... | 349/40 |
| 6,104,449 A | * | 8/2000 | Takahashi et al. ............. | 349/40 |
| 6,175,394 B1 | * | 1/2001 | Wu et al. ...................... | 349/40 |

\* cited by examiner

Primary Examiner—Kenneth Parker
Assistant Examiner—David Chung
(74) Attorney, Agent, or Firm—Howrey Simon Arnold & White, LLP

(57) ABSTRACT

Gate lines and dummy gate lines are respectively located inside a display area and outside the display area. Data lines are arranged perpendicular to and are insulated from the gate lines and the dummy gate lines. A semiconductor layer and a dummy semiconductor layer respectively correspond to and are insulated from the gate line and the dummy gate line. Source electrodes, which respectively overlap an edge of the respective semiconductor layers, and a dummy source electrode, which overlaps an edge of the dummy semiconductor layer are extended from the data line. Drain electrodes, which respectively overlap the edge of the respective semiconductor layers, and a dummy drain electrode, which overlaps the edge of the dummy semiconductor layer, are respectively formed opposite the source electrodes and the dummy source electrode. In this structure, since the dummy drain electrode overlaps the dummy gate line, a dummy storage capacitor is formed therebetween. A pixel electrode is located in a pixel defined by the intersection of the gate lines and the data lines and is electrically connected to the drain electrode. Moreover, the pixel electrode overlaps the gate lines so that a storage capacitor is formed in the pixel. In this invention, a ratio of storage capacitance of one storage capacitor to dummy storage capacitance of one dummy storage capacitor is controlled to be 2.23 and lower.

8 Claims, 8 Drawing Sheets

LIQUID CRYSTAL DISPLAY HAVING AN ELECTROSTATIC PROTECTION CIRCUIT

BACKGROUND OF THE INVENTION (a) Field of the Invention

The present invention relates to a liquid crystal display (referred to as an LCD hereinafter), more particularly, to an LCD having an electrostatic protection circuit.

(b) Description of the Related Art

A liquid crystal display (LCD), which is one type of flat panel displays (FPDs), includes two substrates having transparent electrodes and a liquid crystal layer interposed between the substrates. In the LCD, light transmittance is controlled by varying the voltages applied to the liquid crystal layer. The LCD is increasingly used because of its low driving voltage and low power consumption.

Most of the LCD manufacturing process is performed on a glass substrate. Since the glass substrate is nonconductive, electric charges, which are abruptly generated on the substrate, cannot be dispersed. This may shorten or disconnect metal lines formed on the substrate, or damage the insulating films or TFTs by the electrostatic discharge. Most of such defects, which can not be repaired, decrease the yields. In addition, it requires various limitations in manufacturing process and a specialized equipment and environment to overcome the limitations, increasing overall manufacturing costs.

In a conventional LCD, a plurality of gate lines and a plurality of data lines are formed in a display area for displaying visual images. The gate lines and the data lines cross each other to define a plurality of pixels. A thin film transistor (TFT) is formed in each of the pixels, and a gate terminal and a source terminal of the TFT are respectively connected to one of the gate lines and one of the data lines. Moreover, a storage capacitor is formed between a drain terminal of the TFT and a previous gate line for the pixel. And the drain terminal is also connected to a liquid crystal capacitor. Electric charges in the pixel when the TFT is turned ON are maintained by the two capacitors even after the TFT is turned off. The gate lines and the data lines are extended outside the display area, pads are formed at ends of the gate and data lines, and an electrostatic charge shorting bar that links all the lines is formed outside the pads.

In the LCD manufacturing process, the shorting bar is removed by grinding edge portions of the substrate along grinding lines after attaching a polarizer to the substrate. In the grinding process, the polarizer is also very often ground and damaged, which limits the size of the polarizer and the substrate edge area. Accordingly, it is preferable to attach the polarizer after the grinding step. However, since the shorting bar is removed after grinding, it is not possible to protect the device from the electrostatic charges generated when attaching the polarizer.

An electrostatic charge dispersing circuit is disclosed in a currently pending application, application Ser. No. 09/172,130 filed Oct. 14, 1998, entitled "LIQUID CRYSTAL DISPLAYS AND MANUFACTURING METHODS THEREOF", by inventors Joo-Hyung LEE, Dong-Gyu KIM and Woon-Yong PARK. This application is hereby incorporated by reference.

SUMMARY OF THE INVENTION

It is an object of the present invention to provide a liquid crystal display having an electrostatic protection circuit that effectively prevents the electrostatic damage.

It is another object of the present invention to provide a liquid crystal display that minimizes limitations placed on the LCD manufacturing process.

To achieve the above objects, the present invention provides a liquid crystal display including a plurality of first wires and a plurality of second wires intersecting the first wires. A plurality of pixels are respectively defined by the first wire and the second wire and each pixel has a liquid crystal capacitor, a thin film transistor and a storage capacitor. A plurality of dummy wires are located outside a display area defined by the plurality of pixels and intersect the first wires. A plurality of dummy TFTs are formed outside the display area, and a source terminal and a drain terminal of the dummy TFT are respectively connected to the first wire and the dummy wire. Electrodes of a dummy storage capacitor are respectively connected to the drain terminal of the dummy TFT and the dummy wire. In this structure, a ratio of a storage capacitance of the storage capacitor located in the display area to a storage capacitance of the dummy storage capacitor located outside the display area is no higher than 2.23.

Meanwhile, it is possible that the ratio of the storage capacitance of the storage capacitor to the storage capacitance of the dummy storage capacitor is no higher than 1.95. Moreover, more than two dummy storage capacitors may be coupled to one another.

It is also possible that a transparent electrode is located opposite the drain terminal of the dummy TFT, and a storage capacitor is formed by the electrode and the drain terminal overlapping the electrode via a passivation film.

In the LCD, it is possible to avoid defects arising from electrostatic charges without limiting the storage capacitance, which is an inherent design parameter for a display device, inside the display area.

DETAILED DESCRIPTION OF THE PREFERRED EMBODIMENTS

Figure 1:
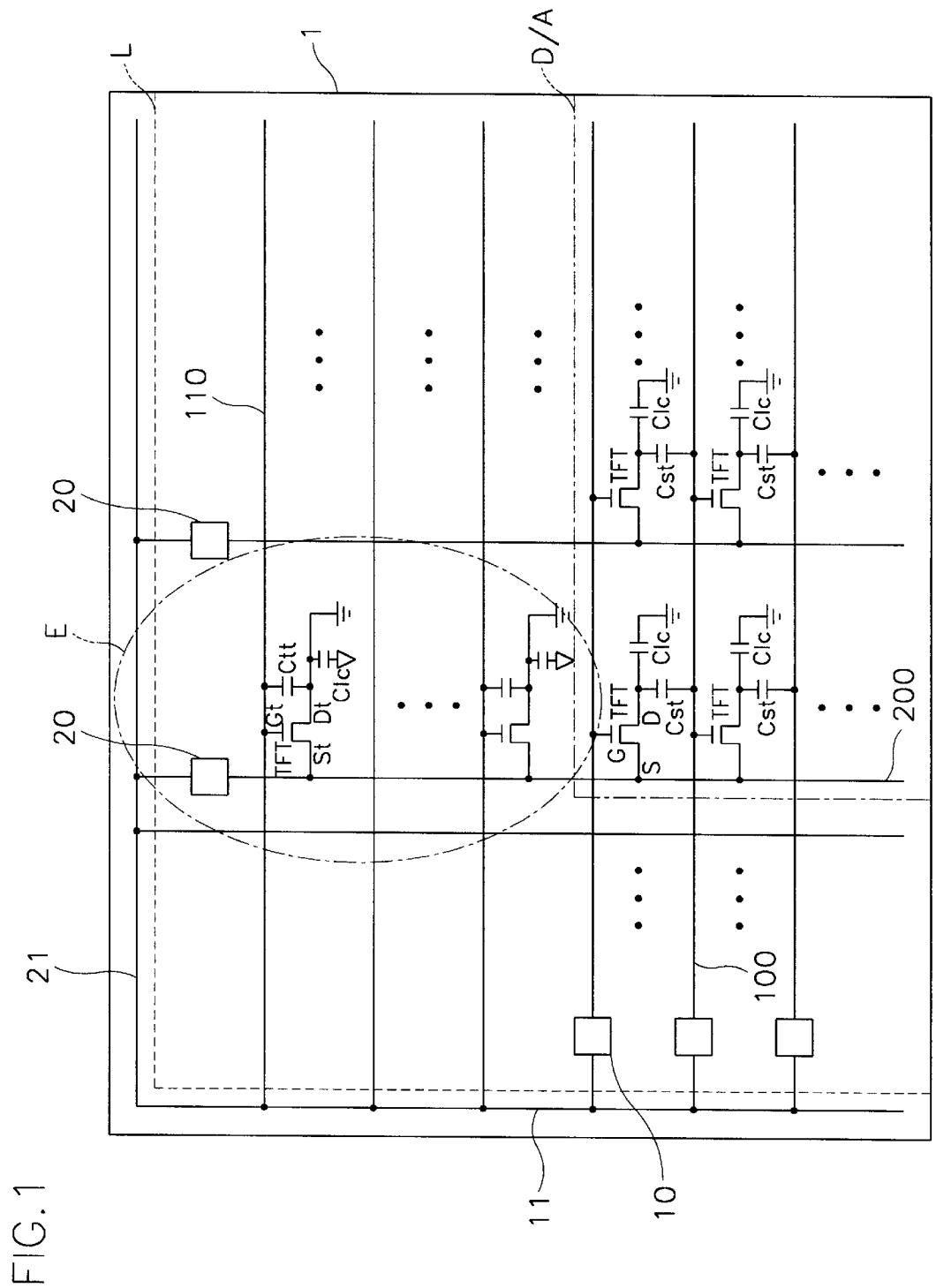
FIG. 1 is a layout view schematically showing a liquid crystal display (LCD) according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

FIG. 1 is a layout view schematically illustrating a liquid crystal display (LCD) according to the present invention.

As shown in FIG. 1, a panel for the LCD has a display area (D/A) where a visual image is displayed and a pad area which is located outside the display area. A plurality of gate lines 100 and a plurality of data lines 200 are formed on an insulating substrate 1 and intersect each other. Thin film transistors (TFTs), which are switching devices, are formed in each pixel region defined by intersections of the gate and data lines 100 and 200. A gate terminal (G) and a source terminal (S) of each the TFT are respectively connected to one gate line 100 and one data lines 200. Moreover, a storage capacitor $C_{st}$ is formed between a drain terminal (D) of the TFT and a gate line 100 adjacent to the gate line 100 to which the gate terminal (G) is connected, an electrode of the storage capacitor $C_{st}$ being connected to the adjacent gate line 100. A liquid crystal capacitor $C_{lc}$ is also provided in each pixel, and an electrode of the liquid crystal capacitor $C_{lc}$ is connected to the drain terminal (D) of the TFT.

The gate lines 100 and the data lines 200 are extended from the display area (D/A) into the pad area, and a gate pad 10 and a data pad 20 are formed in the pad area and respectively connected to ends of each gate line 100 and data line 200. A gate shorting bar 11 and a data shorting bar 21, which respectively link all the gate lines 100 and all the data lines 200 at their ends, are formed in the pad area. The gate and data shorting bars 11 and 21 are located near edges of the panel 1, and are electrically connected to each other.

A plurality of dummy gate lines 110 are formed between the data pads 20 and the border of the display area (D/A) and intersect the data lines 200. Moreover, within the areas defined by the dummy gate lines 110 and the data lines 200, dummy thin film transistors (dummy TFTs) having gate terminals ($G_t$) connected to the dummy gate lines 110 and source terminals ($S_t$) connected to the data lines 200 are formed. There are also formed dummy storage capacitors ($C_{tt}$), one electrode of which is connected to the drain terminal ($G_t$) of the dummy TFT and another electrode of which is connected to one of the dummy gate lines 110, and liquid crystal capacitors ($C_{lc}$), an electrode of which is connected to a drain terminal ($D_t$) of the dummy TFT.

In the LCD of the present invention, if electrostatic charges enter through the data pads 20, they flow along the data lines 200, pass through channels of the dummy TFTs and then get stored in the dummy storage capacitors $C_{tt}$. It is also possible for the electrostatic charges to dissipate by destroying the dummy TFTs. As a result, the panel is effectively protected from electrostatic damages by directing the electrostatic charges into the dummy pixels.

Figure 2:
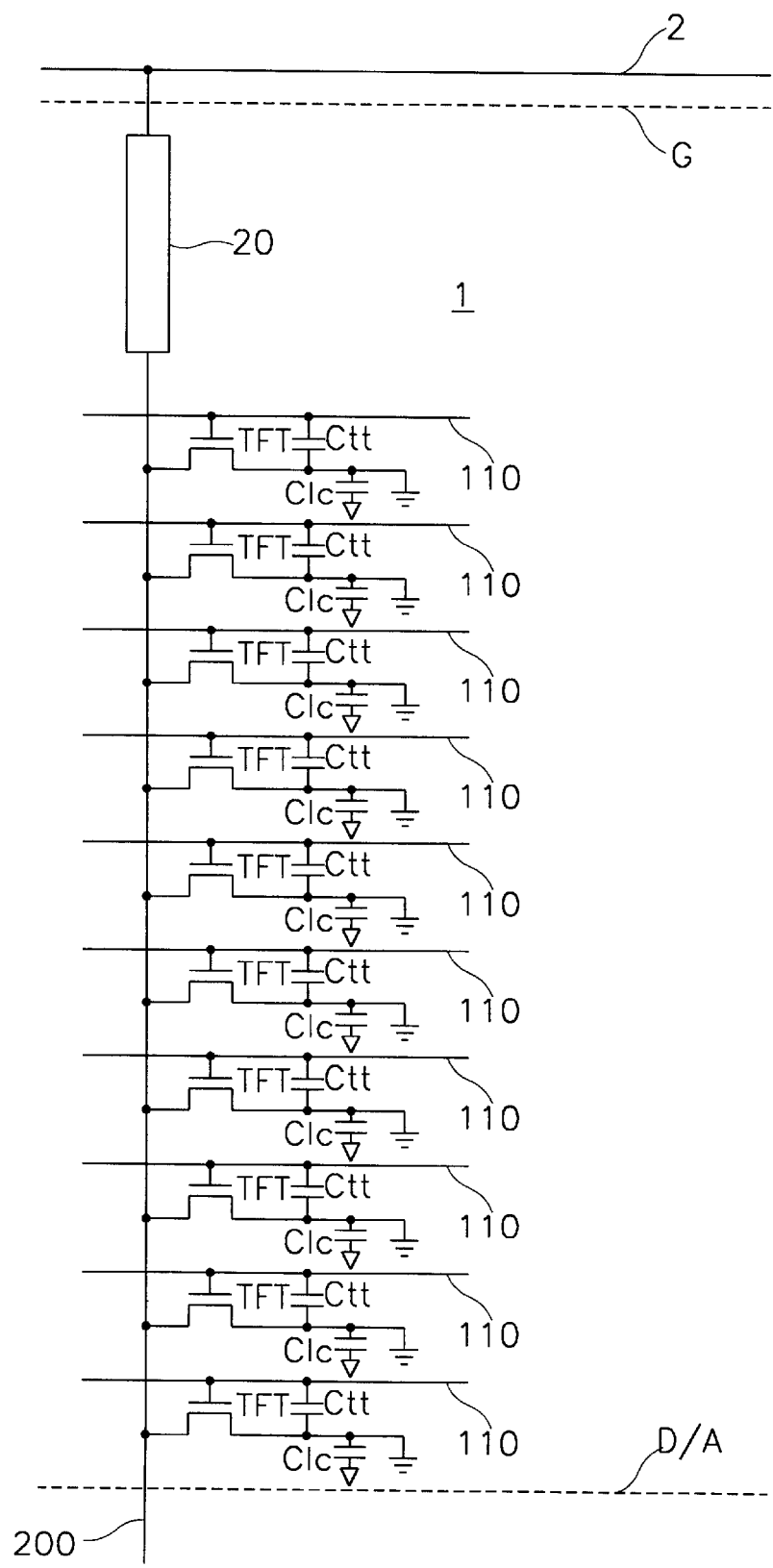
FIG. 2 is an enlarged layout view of portion E in FIG. 1, showing electrostatic protection circuits according to a first preferred embodiment of the present invention.

FIG. 2 is an enlarged view of portion E in FIG. 1, showing electrostatic protection circuits according to a first preferred embodiment of the present invention.

As shown in FIG. 2, electrostatic protection circuits, each of which is connected to one of the dummy thin film transistors (dummy TFTs), the dummy storage capacitors ($C_{tt}$) and the liquid crystal capacitor ($C_{lc}$) in the same manner as shown in FIG. 1, are formed between the data pads 20 and the border of the display area (D/A). To enable the sufficient dissipation of the electrostatic charges outside the display area (D/A), it is preferable that 10 or more electrostatic protection circuits are provided.

Wiring and a pattern used to form the electrostatic protection circuits will be described more in detail following the description of other concepts.

It is possible to improve the protection against electrostatic charges by controlling a size of a dummy storage capacitance $c_{tt}$ generated outside the display area (D/A) relative to a storage capacitance $c_{st}$ generated inside the display area (D/A).

Figure 3:
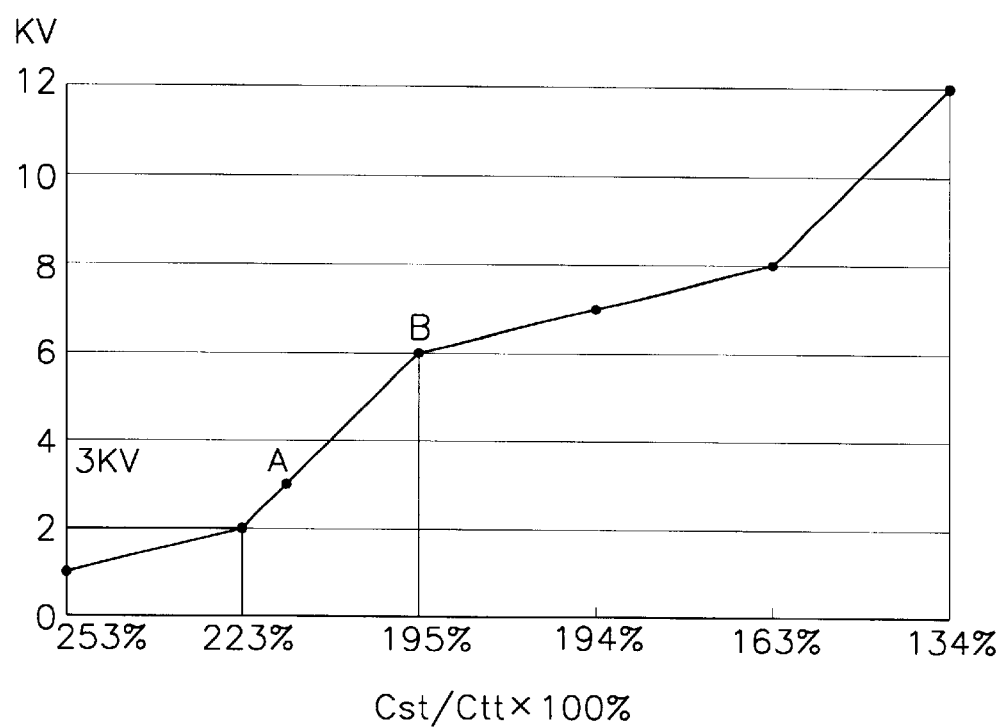
FIG. 3 is a graph showing variations in breakdown voltages in relation to a ratio of a storage capacitance generated inside a display area to a dummy storage capacitance generated outside the display area.

FIG. 3 is a graph showing variations in breakdown voltages of the TFTs in relation to a ratio of a storage capacitance of one storage capacitor formed inside a display area to a dummy storage capacitance of one dummy storage capacitor formed outside the display area.

FIG. 3 shows the results of an experiment performed using 10 storage capacitors, which are formed inside the display area, and 10 dummy storage capacitors, which are formed outside the display area. Since electrostatic charges are generated in a small region over a short period of time, it is not necessary to use all the storage capacitors in the display area (D/A) for the measurement.

As shown in FIG. 3, the lower the ratio ($c_{st}/c_{tt}$) of the storage capacitance to the dummy storage capacitance is, the higher the breakdown voltage (the level of electrostatic charges at which the TFT is damaged) becomes. For example, at point (A), where a ratio of $c_{st}/c_{tt} \times 100\%$ is 223%, the LCD is safe against electrostatic charges having an electric charge value of about 2 kV. Therefore, if the ratio of $c_{st}/c_{tt} \times 100\%$ is maintained at 223% and below, it is possible to avoid the damage to the TFT caused by electrostatic charges generated during the LCD manufacturing process.

At point (B) where the ratio of $c_{st}/c_{tt} \times 100\%$ is about 195%, it is possible to avoid panel defects against electrostatic charges having an electric charge value of about 6 kV and below. Accordingly, when the ratio of $c_{st}/c_{tt} \times 100\%$ is around 195% and below, it is possible to remarkably improve the protection against the electrostatic charges. It is also possible to avoid panel defects caused by the electrostatic charges even when the panel edges are ground before attaching a polarizer.

In order to reduce the ratio of $c_{st}/c_{tt}$ the storage capacitance $c_{st}$ needs to be decreased or the dummy storage capacitance $c_{tt}$ needs to be increased.

However, there is a limit in reducing the ratio of $c_{st}/c_{tt}$ by decreasing the storage capacitance $c_{st}$ because the storage capacitance $c_{st}$ is an inherently set parameter. Therefore, the ratio of $c_{st}/c_{tt}$ must be reduced by increasing the dummy storage capacitance $c_{tt}$. The dummy storage capacitance $c_{tt}$ can be controlled to various levels with respect to the inherent level of the storage capacitance $c_{tt}$ of the devices.

Figure 4:
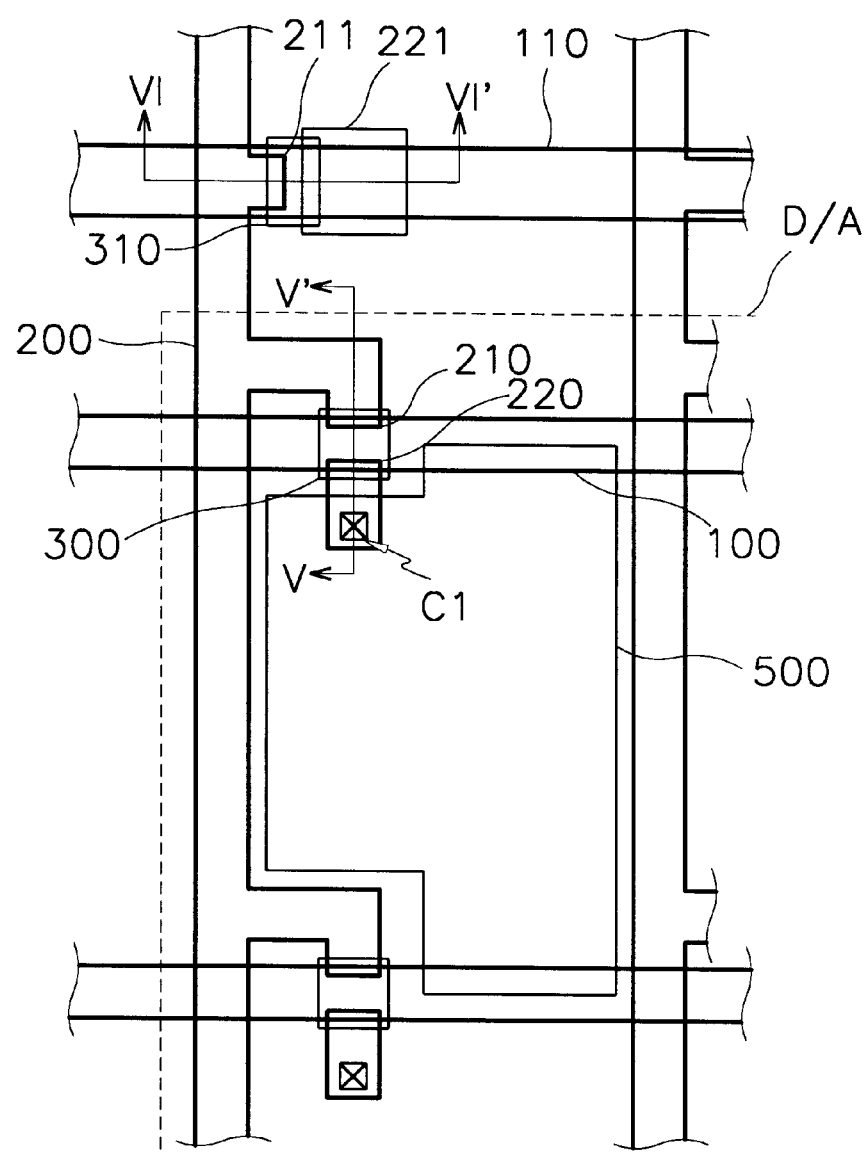
FIG. 4 is a layout view of a pattern for an electrostatic protection circuit according to a first preferred embodiment of the present invention.
Figure 5:
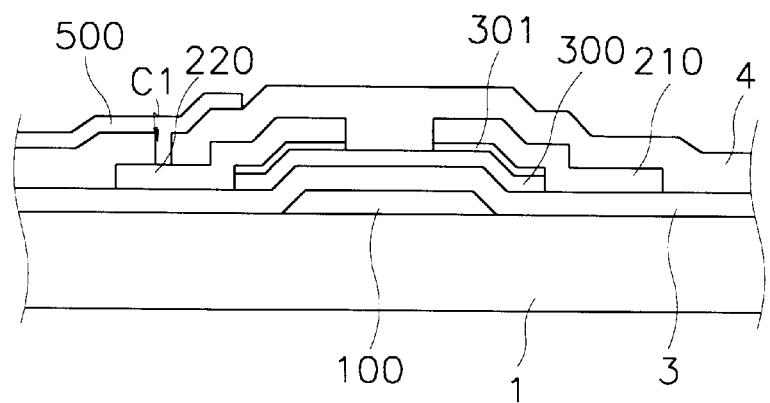
FIG. 5 is a cross-sectional view taken along line V–V' of FIG. 4.

FIG. 4 is a layout view of a pattern for an electrostatic protection circuit according to a first embodiment of the present invention, where the pattern shows a pixel located inside the display area and an electrostatic protection circuit located outside the display area. FIG. 5 is a cross-sectional view taken along line V–V' of FIG. 4, and FIG. 6 is a cross-sectional view taken along line VI–VI' of FIG. 4.

Figure 6:
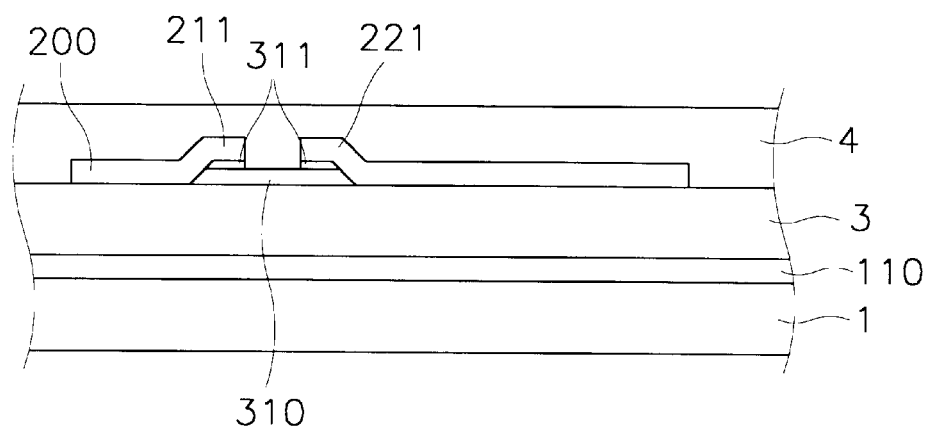
FIG. 6 is a cross-sectional view taken along line VI–VI' of FIG. 4.

As shown in FIGS. 4 to 6, gate lines 100 are formed on an insulating substrate corresponding to a display area (D/A)

and arranged in the horizontal direction. A dummy gate line 110 is formed outside the display area (D/A) and arranged in parallel with the gate lines 100. Although not shown in FIG. 4, it is necessary that there are at least ten (10) dummy gate lines 110. A gate insulating film 3 covers the gate lines 100 and the dummy gate line 110. Data lines 200 are formed on the gate insulating film 2, intersect the gate lines 100 and the dummy gate line 110, and are arranged in the vertical direction.

A semiconductor layer 300 is provided on each of the gate lines 100, and a dummy semiconductor layer 310 is provided on the dummy gate line 110. The semiconductor layers 300 and 310 are formed on the insulating film 3. Source electrodes 210, which overlap an edge of the semiconductor layers 300, and a dummy source electrode 211, which overlaps an edge of the dummy semiconductor layer 310, are formed on the insulating film 3 and extended from the data line 200. Drain electrodes 220, which overlap the edge of the semiconductor layers 300, and a dummy drain electrode 221, which overlaps the edge of the dummy semiconductor layer 310, are respectively formed opposite the source electrodes 210 and the dummy source electrode 220.

An Ohmic contact layer 301 for improving electrical contact characteristics is formed between the source electrode 210 and the semiconductor layer 300 and between the drain electrode 220 and the semiconductor layer 300. Another Ohmic contact layer 311 is formed between the dummy source electrode 211 and the dummy semiconductor layer 310, and between the dummy drain electrode 221 and the dummy semiconductor layer 310.

As shown in FIGS. 4 and 6, since the dummy drain electrode 221 overlaps the dummy gate line 110 with a fixed length and width, a dummy storage capacitor $C_{tt}$ is formed.

An interlayer insulating film 4 covers the data lines 200, the source and drain electrodes 210 and 220, the dummy source and dummy drain electrodes 211 and 221, the semiconductor layer 300 and the dummy semiconductor layer 310. A transparent pixel electrode 500 is formed on the interlayer insulating film 4 and located in a pixel defined by the intersection of the gate lines 100 and the data lines 200. The pixel electrode 500 is connected to the drain electrode 220 through a contact hole C1 that is formed in the interlayer insulating film 4. Moreover, the pixel electrode 500 partially overlaps the gate lines 100 or a storage electrode line (not shown). A storage capacitor $C_{st}$ is formed in the pixel by this structure.

As described above, for reducing the percentage of $C_{st}C_{tt}$, it is more effective to increase the dummy storage capacitance $C_{tt}$. The structure for increasing the dummy storage capacitance $C_{tt}$ will be described with reference to FIG. 7 and FIG. 8 hereinafter.

Figure 7:
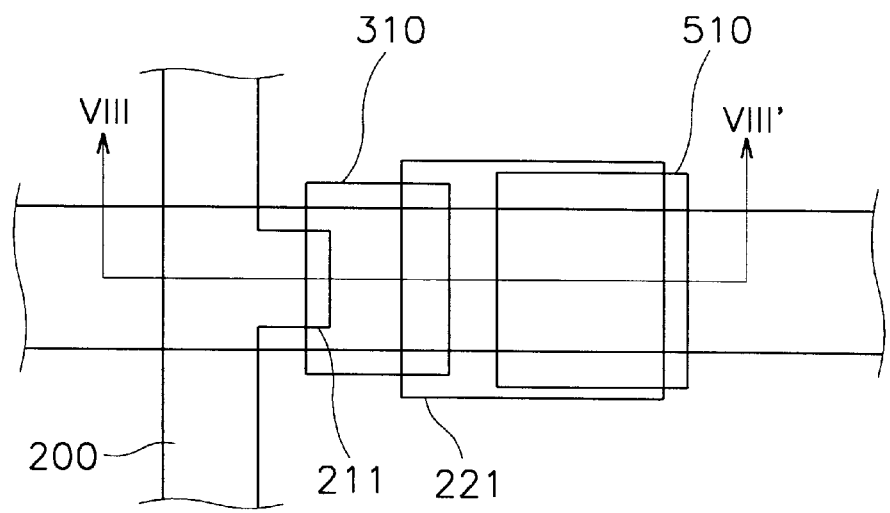
FIG. 7 is a layout view of a pattern for an electrostatic protection circuit according to a second preferred embodiment of the present invention.
Figure 8:
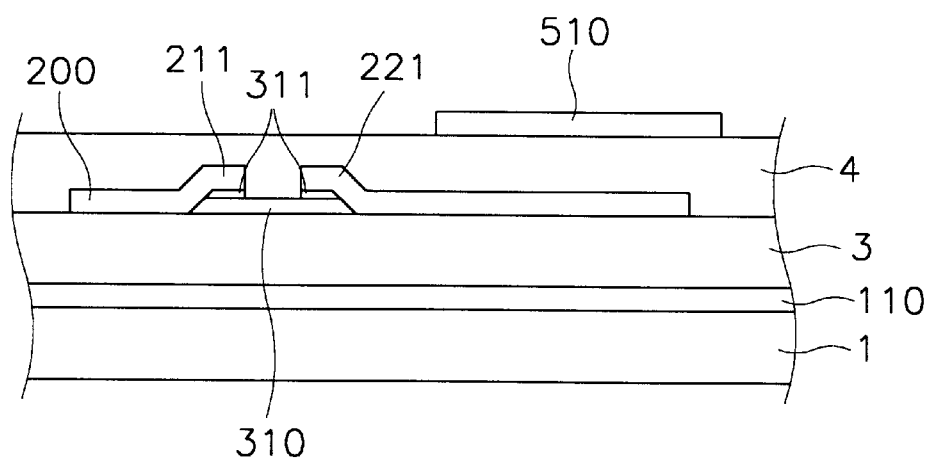
FIG. 8 is a cross-sectional view taken along line VII-I–VIII' of FIG. 7.

FIG. 7 is a layout view of a pattern for an electrostatic protection circuit according to a second preferred embodiment of the present invention, and FIG. 8 is a cross-sectional view taken along line VIII–VIII' of FIG. 7.

Most of the electrostatic protection circuit pattern according to the second preferred embodiment is the same as that of the first preferred embodiment. However, as shown in FIG. 7 and FIG. 8, a transparent pattern 510, for forming a storage electrode, is formed on the interlayer insulating film 4 and overlaps the dummy drain electrode 221 and the dummy gate line 110. Therefore, dummy storage capacitors are formed between the dummy drain electrode 221 and the transparent pattern 510 as well as between the dummy drain electrode 221 and the dummy gate line 110. It is possible to electrically connect the transparent pattern 510 to the dummy gate line 110.

Electrostatic protection circuits according to a third preferred embodiment of the present invention will be described hereinafter. In this embodiment, a plurality of dummy storage capacitors, which are located outside a display area, are linked together to improve the protection against electrostatic charges.

Figure 9:
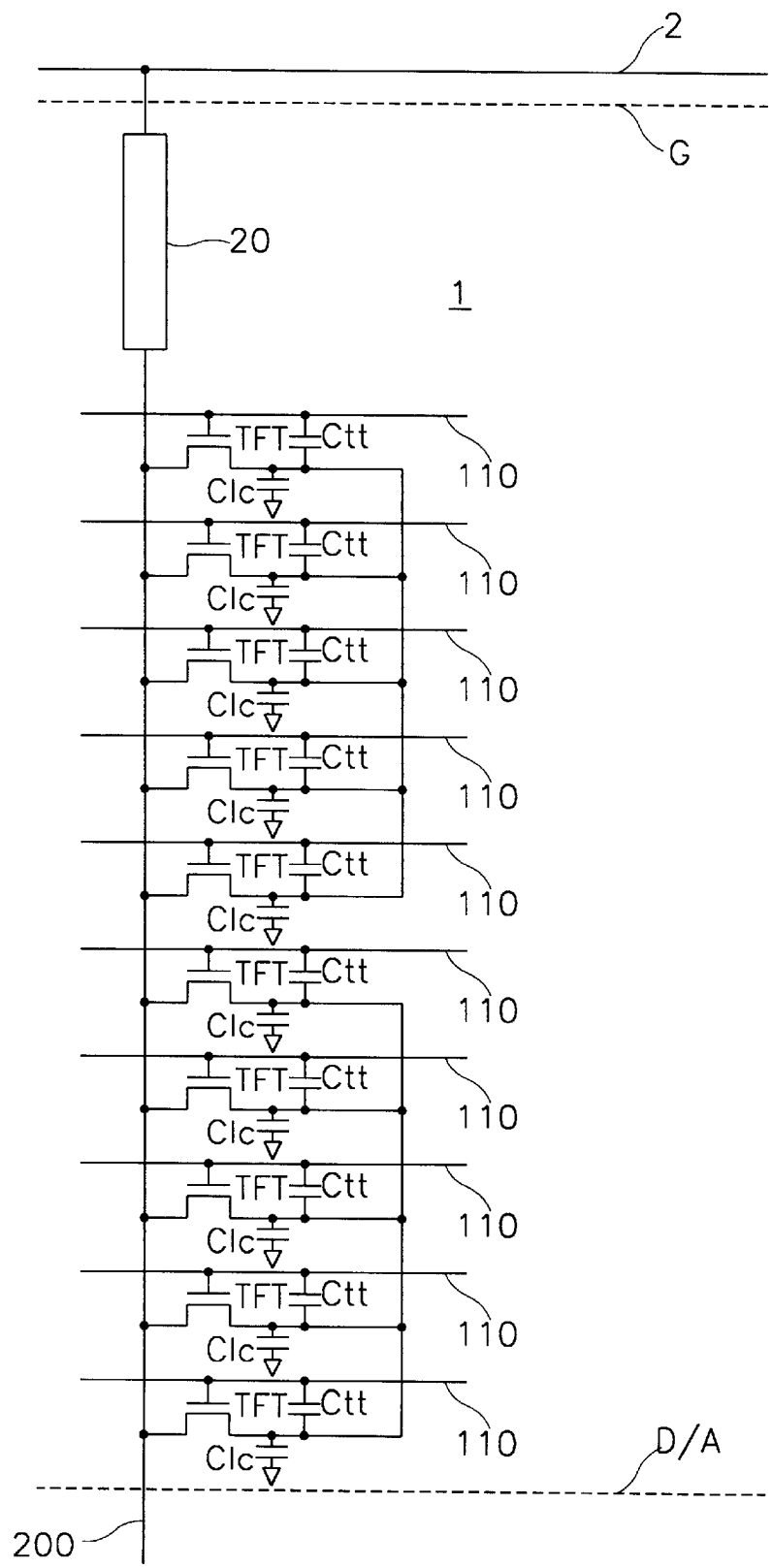
FIG. 9 is an enlarged layout view of portion E in FIG. 1, illustrating electrostatic protection circuits according to a third preferred embodiment of the present invention.
Figure 10:
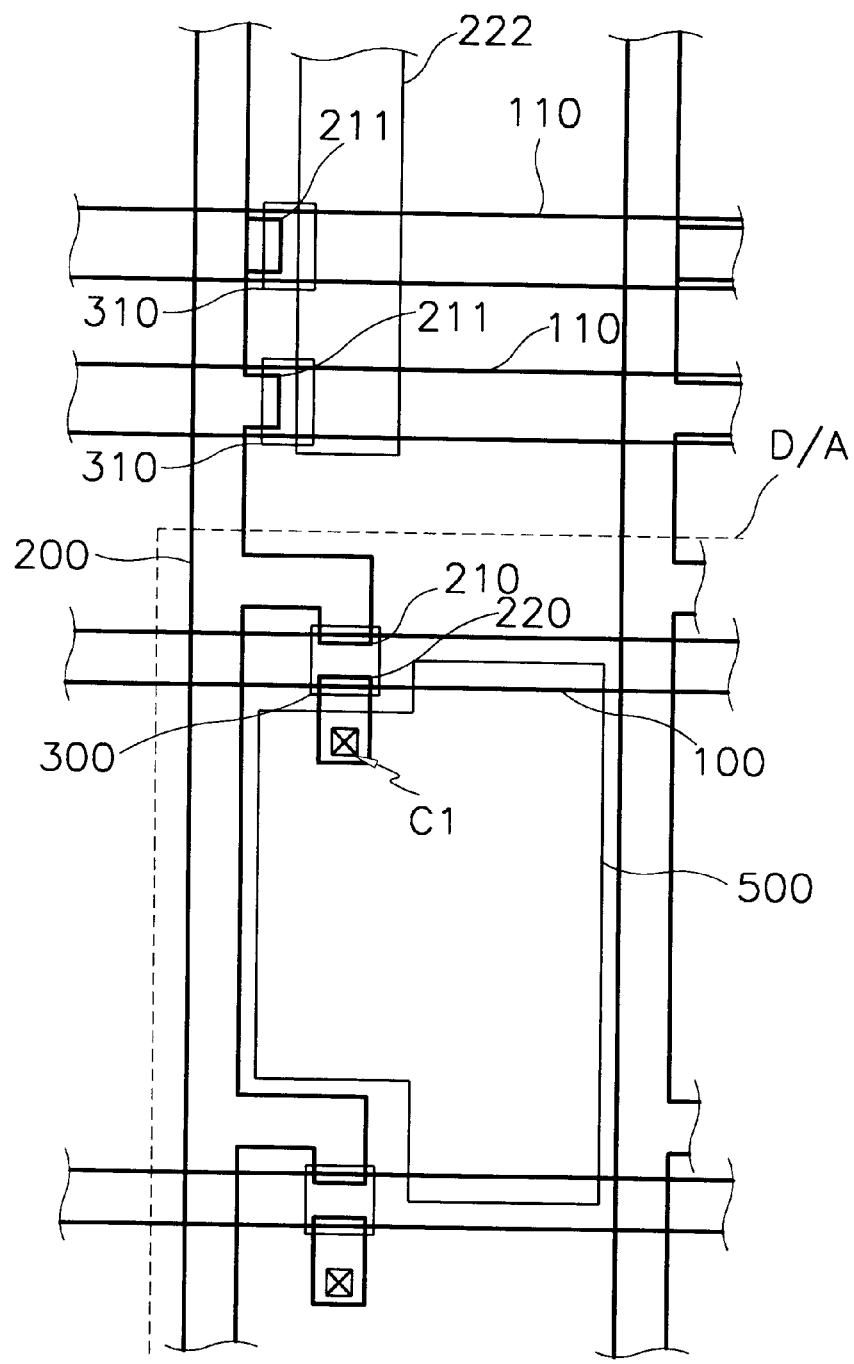
FIG. 10 is a layout view of a pattern for an electrostatic protection circuit according to a third preferred embodiment of the present invention.

FIG. 9 is an enlarged view of portion E in FIG. 1, showing electrostatic protection circuits according to a third preferred embodiment of the present invention, and FIG. 10 is a layout view showing a pattern for an electrostatic protection circuit according to a third preferred embodiment of the present invention.

The electrostatic protection circuit according to a third preferred embodiment is similar to the first preferred embodiment. However, as shown in FIG. 9 and FIG. 10, a plurality of the dummy storage capacitors $C_{tt}$, which are connected to one of the dummy gate lines 110, are grouped and connected in parallel. In other words, the drain electrode 222 simultaneously overlaps a plurality of adjacent dummy gate lines 110.

Table 1 shows the effects of controlling electrostatic charges by the electrostatic protection circuit according to the first embodiment, where the dummy storage capacitors are not connected to one another, and by the electrostatic protection circuit according to the third embodiment, where the dummy storage capacitors are connected to one another.

As shown in Table 1, storage capacitance $c_{st}$ of a single storage capacitor in the display area is about 0.48 pF and a dummy storage capacitance $c_{tt}$ of a single dummy storage capacitor outside the display area is 0.247 pF. The number of dummy storage capacitors formed outside the display area is 10 in the first and second embodiments, totaling dummy storage capacitance $c_{tt}$ of the same value, 2.47 pF, in the both embodiments.

TABLE 1

|  | Single $C_{st}$ (pF) | Single $C_{tt}$ (pF) | Total $C_{tt}$ (pF) | Break down voltage(KV) |
| --- | --- | --- | --- | --- |
| 1st embodiment | 0.48 | 0.247 | 2.47 | 7 |
| 2nd embodiment |  |  |  | 8 |

However, the breakdown voltage against electrostatic charges in the third embodiment, where the storage capacitors are linked together in groups of five is higher than that in the first embodiment. In other words, the breakdown voltage in the first embodiment is about 7 KV, while the breakdown voltages in the third embodiment is about 8 KV. Therefore, it is possible to improve the protection against electrostatic charges by linking a plurality of the dummy storage capacitors. This is because linking the dummy storage capacitors to one another is effectively forming a relatively large storage capacitance with respect to each wire.

As described above, in the LCD of the present invention, a ratio of a storage capacitance formed in each pixel inside the display area to a dummy storage capacitance formed in each dummy pixel outside the display area is controlled to be 2.23. As a result, it is possible to avoid defects caused by electrostatic charges without limiting the storage capacitance inside the display area, which is an inherent design parameter for LCDs, and therefore reducing manufacturing costs.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A liquid crystal display comprising:

an insulating substrate;

a plurality of first wires formed on the substrate;

a plurality of second wires intersecting the first wires;

a plurality of pixels each of which is connected to the first wire and to the second wire and has a liquid crystal capacitor, a thin film transistor and a storage capacitor;

a plurality of dummy wires formed outside a display area defined by the plurality of the pixels and intersecting the plurality of the first wires;

a plurality of dummy thin film transistors that respectively have a first terminal, a second terminal and a third terminal, the first terminal and the second terminal being respectively connected to the first wire and to the dummy wire; and a plurality of dummy storage capacitors each of which is connected to the third terminal of the dummy thin film transistor and to the dummy wire, wherein a ratio of a storage capacitance of the storage capacitor to dummy storage capacitance of the dummy storage capacitor is 2.23 and lower.

2. A liquid crystal display according to claim 1, wherein at least two of the dummy storage capacitors are linked in parallel.

3. A liquid crystal display according to claim 1, wherein the ratio of storage capacitance of the storage capacitor to dummy storage capacitance of the dummy storage capacitor is 1.95 and lower.

4. A liquid crystal display according to claim 1, wherein the dummy storage capacitors are at least 10.

5. A liquid crystal display comprising:

a substrate that has a display area defined by a plurality of pixels each of which include a thin film transistor and a storage capacitor, and a pad area located outside the display area;

a plurality of dummy gate lines that are formed on the substrate, and located between the pad area and a border of the display area;

a gate insulating film that covers the dummy gate lines;

a plurality of dummy semiconductor layers each of which is formed on the gate insulating film and located opposite the dummy gate line;

data lines that are formed on the gate insulating film and arranged substantially perpendicular to the dummy gate lines;

a plurality of dummy source electrodes that are extended from the data lines, each of which overlaps an edge of the dummy semiconductor layer; and a plurality of dummy drain electrodes that overlaps the dummy gate lines, each of which overlaps the edge of the dummy semiconductor layer opposite the dummy source electrode, wherein a ratio of storage capacitance of the storage capacitor inside the display area to dummy storage capacitance generated between the dummy gate line and the dummy drain electrode is 2.23 and lower.

6. A liquid crystal display according to claim 5, wherein the ratio of storage capacitance of the storage capacitor inside the display area to dummy storage capacitance generated between the dummy gate line and the dummy drain electrode is 1.95 and lower.

7. A liquid crystal display according to claim 5, wherein the dummy drain electrode overlaps at least two of the dummy gate lines.

8. A liquid crystal display according to claim 5, further comprising:

a passivation film that covers the dummy semiconductor layers, the dummy source electrodes, the dummy drain electrodes and the data lines; and a plurality of transparent conductive patterns each of which is formed on the passivation film and overlaps the dummy drain electrode.

* * * * *